(12) United States Patent
Banham et al.

(10) Patent No.: US 11,047,251 B2
(45) Date of Patent: Jun. 29, 2021

(54) ROUTING FOR ELECTRICAL COMMUNICATION IN GAS TURBINE ENGINES

(71) Applicant: Rolls-Royce Corporation, Indianapolis, IN (US)

(72) Inventors: Christopher Banham, Indianapolis, IN (US); Rex M. Little, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 40 days.

(21) Appl. No.: 16/514,258

(22) Filed: Jul. 17, 2019

(65) Prior Publication Data

US 2021/0017879 A1    Jan. 21, 2021

(51) Int. Cl.
| | | |
|---|---|---|
| *F01D 15/00* | (2006.01) | |
| *F01D 15/10* | (2006.01) | |
| *H02K 7/18* | (2006.01) | |
| *H02K 5/22* | (2006.01) | |
| *F01D 9/06* | (2006.01) | |

(52) U.S. Cl.
CPC ............. *F01D 15/10* (2013.01); *F01D 9/065* (2013.01); *H02K 5/225* (2013.01); *H02K 7/1823* (2013.01); *F05D 2220/76* (2013.01)

(58) Field of Classification Search
CPC ......... F01D 15/10; F01D 9/065; H02K 5/225; H02K 7/1823; F05D 2220/76; F05D 2240/14; F02C 7/32
See application file for complete search history.

(56) References Cited

U.S. PATENT DOCUMENTS

| | | | |
|---|---|---|---|
| 3,264,482 A | * | 8/1966 | Clark ................... F02C 7/268 290/38 A |
| 5,237,817 A | * | 8/1993 | Bornemisza ............ F01D 25/16 60/226.1 |
| 7,281,318 B2 | | 10/2007 | Marshall et al. |
| 7,855,483 B2 | | 12/2010 | Bouiller et al. |
| 8,745,990 B2 | | 6/2014 | Burkholder et al. |
| 9,730,274 B2 | | 8/2017 | Broughton et al. |
| 9,847,629 B2 | | 12/2017 | Moisei et al. |
| 2002/0172593 A1 | | 11/2002 | Udall |
| 2007/0084216 A1 | | 4/2007 | Mazeaud et al. |
| 2009/0317238 A1 | * | 12/2009 | Wood .................... F01D 25/162 415/119 |
| 2013/0149127 A1 | | 6/2013 | Hasting et al. |
| 2017/0334377 A1 | * | 11/2017 | Klemen ................. F01D 17/24 |
| 2018/0050806 A1 | | 2/2018 | Kupiszewski et al. |
| 2018/0328288 A1 | | 11/2018 | Lemarchand et al. |

* cited by examiner

*Primary Examiner* — Todd E Manahan
*Assistant Examiner* — Edwin Kang
(74) *Attorney, Agent, or Firm* — Barnes & Thornburg LLP

(57) ABSTRACT

Gas turbine engines which include electrical motor-generator assemblies arranged near the fan outlet include electrical cable routing assemblies extending through a bypass flow path. Directing the electrical cables through a king guide vane can consolidate routing requirements while accessing each of electrical windings of the electrical machine.

18 Claims, 3 Drawing Sheets

ROUTING FOR ELECTRICAL COMMUNICATION IN GAS TURBINE ENGINES

This invention was made with government support under NNC14CA29C (Phase III) awarded by National Aeronautics and Space Administration. The government has certain rights in the invention.

BACKGROUND

The present disclosure relates generally to gas turbines engines, and more specifically to electrical subassemblies of gas turbine engines.

Gas turbine engines can be used to power aircraft, watercraft, electrical generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Exhaust products of the combustion reaction in the combustor are directed into the turbine where work is extracted to drive the compressor and, sometimes, an output shaft, fan, or propeller. Portions of the work extracted from the turbine can be used to drive various subsystems such as generators.

SUMMARY

The present disclosure may comprise one or more of the following features and combinations thereof.

According to an aspect of the present disclosure, an electrical power routing assembly for providing electrical communication with an electrical machine of a gas turbine engine may include a network of electrical cables for communicating electrical power, each of the electrical cables configured to connect with corresponding windings of the electrical machine that are arranged circumferentially about a rotational axis of the gas turbine engine, wherein each of the electrical cables includes an inner radial extent formed to extend radially between connection with a corresponding one of the windings and a divider defining a primary flow path of the gas turbine engine, and an outer radial extent formed to extend radially between the divider and an outer boundary wall defining a bypass flow path of the gas turbine engine; and a king guide vane configured for connection as a structural support within the bypass flow path of the gas turbine engine. The king guide vane may include an airfoil body extending radially between the divider and the outer boundary wall. The airfoil body may define a routing passageway therein, wherein the outer radial extent of each of the network of electrical cables extends through the routing passageway.

In some embodiments, the inner radial extent of each of the network of electrical cables may be configured to extend radially through the primary flow path of the gas turbine engine. Each of the electrical cables may be configured to connect with the corresponding windings of the electrical machine that are arranged circumferentially spaced apart from each other about the rotational axis of the gas turbine engine. Each of the electrical cables may be configured to connect with the corresponding windings that are equally circumferentially spaced apart from each other.

In some embodiments, the network of electrical cables may be configured to communicate an entire amount of electrical power communication with the electrical machine. The electrical machine may be formed as electrical motor-generator configured for mechanical connection with a fan drive shaft of the gas turbine engine. The king guide vane may be formed as an outlet guide vane for guiding bypass air received from a fan of the gas turbine engine.

In some embodiments, at least some of the electrical cables may include a circumferential extent arranged to extend circumferentially about the rotational axis of the gas turbine engine. The circumferential extent of the electrical cables may extend circumferentially between the inner and outer radial extents. In some embodiments, the routing passageway may comprise a number of isolated paths extending through the body of the king guide vane, each path receiving one of the electrical cables of the network.

According to another aspect of the present disclosure, a gas turbine engine may include an turbine engine assembly including a fan for drawing air, a compressor for receiving air from the fan for compression, a combustor for receiving compressed air from the fan for combustion with fuel to generate combustion gases, a turbine for receiving combustion gases from the combustor for expansion to provide rotational drive to a fan shaft for transmission to the fan, and an electrical machine coupled with the fan shaft to communicate rotational force, wherein the turbine engine assembly includes a primary flow path providing air from the fan to the compressor, and a bypass flow path providing air from the fan for bypassing the compressor, a network of electrical cables for communicating electrical power, each of the electrical cables configured to connect with corresponding windings of the electrical machine that are arranged circumferentially about a rotational axis of the gas turbine engine, wherein each of the electrical cables includes an inner radial extent formed to extend radially between connection with a corresponding one of the windings and a divider defining the primary flow path of the gas turbine engine, and an outer radial extent formed to extend radially between the divider and an outer boundary wall defining the bypass flow path of the gas turbine engine; and a king guide vane configured for connection as a structural support within the bypass flow path of the gas turbine engine. The king guide vane may include an airfoil body extending radially between the divider and the outer boundary wall. The airfoil body may define a routing passageway therein, wherein the outer radial extent of each of the network of electrical cables extends through the routing passageway.

In some embodiments, the inner radial extent of each of the network of electrical cables may be configured to extend radially through the primary flow path of the gas turbine engine. The windings of the electrical machine may be arranged equally circumferentially spaced apart from each other about the rotational axis of the gas turbine engine. The network of electrical cables may be configured to provide an entire amount of electrical power communication with the electrical machine.

In some embodiments, the electrical machine may be formed as electrical motor-generator coupled for rotation with the fan shaft to selectively provide and receive rotational force. The king guide vane may be formed as an outlet guide vane for guiding bypass air received from the fan of the gas turbine engine. The king guide vane may be circumferentially aligned with one of the windings of the electrical machine.

In some embodiments, at least some of the electrical cables may include a circumferential extent arranged to extend circumferentially about the rotational axis of the gas turbine engine to connect between the inner and outer radial extents. In some embodiments, the routing passageway may comprise a number of isolated paths extending through the body of the king guide vane, each path receiving one of the electrical cables of the network.

In some embodiments, the inner radial extents of each electrical cable extending through a corresponding strut of an air inlet housing. In some embodiments, at least one of the king guide vane and an air inlet housing may include cooling air passages arranged in thermal communication with the cables to receive air therethough to reduce cable temperature.

These and other features of the present disclosure will become more apparent from the following description of the illustrative embodiments.

DETAILED DESCRIPTION OF THE DRAWINGS

Figure 1:
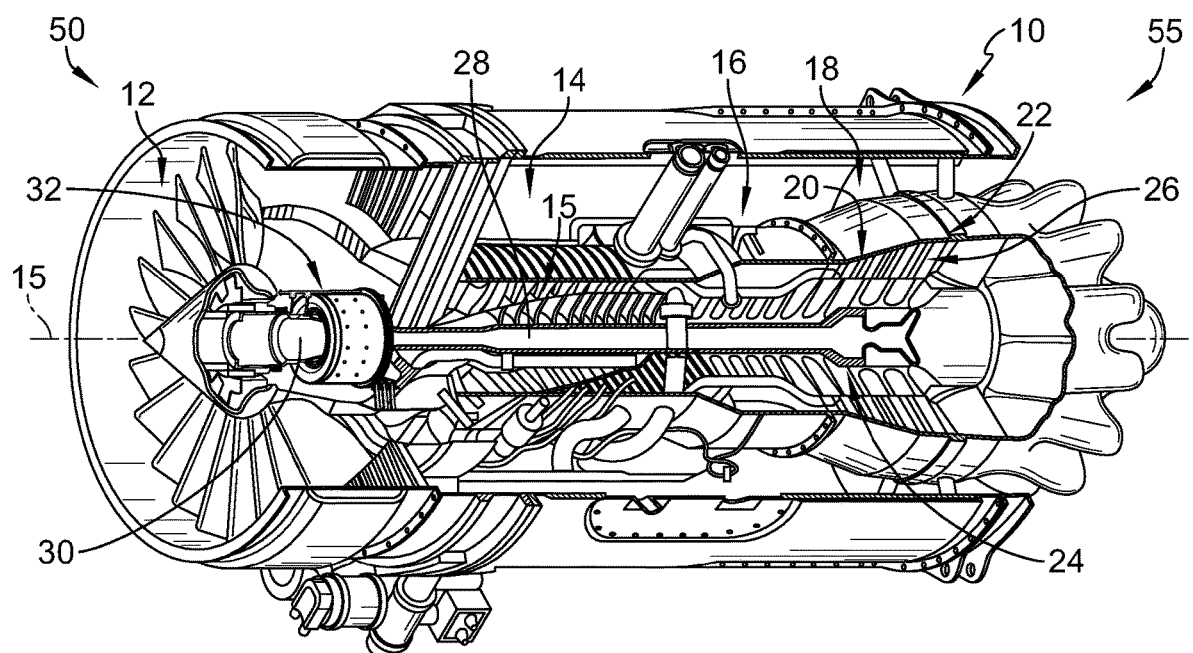
FIG. 1 is an perspective view of gas turbine engine having a portion cutaway to show that the engine includes a core flow path including a fan for drawing air, a compressor for compressing air from the fan, a combustor for combusting fuel mixed with compressed air from the compressor, and a turbine including a rotor and blades for expanding exhaust products to rotate the rotor and a fan shaft for driving the fan, and showing that the engine includes a motor-generator coupled with the fan shaft for selectively providing drive and generation modes of operation.

For the purposes of promoting an understanding of the principles of the disclosure, reference will now be made to a number of illustrative embodiments illustrated in the drawings and specific language will be used to describe the same.

Gas turbine engines may be adapted for various uses, such as to propel aircraft, watercraft, and/or for power generation. The electrical power demands on gas turbine engines adapted for such uses are rapidly increasing due to the growing number and power requirements of components such as processors, actuators, power electronics, and accessories. However, drawing additional electric power from common auxiliary high pressure (HP) driven electric generators can limit the operation of the gas turbine engine, for example, by decreasing certain operating margins at peak demand, such as compressor surge margins.

The present disclosure includes gas turbine engines that include low pressure (LP) motor-generators configured to supply of electric power. In certain adapted uses of the engines, for example, when adapted for use in an aircraft, the present disclosure includes devices, systems, and methods for integration of low pressure (LP) motor-generators into turbofan gas turbine engines. Motor-generators include devices that can be selectively operated in a first mode to generate electricity for use in other systems and in a second mode to drive mechanical rotation by consumption of electrical power. Coordinated operation of low pressure (LP) and/or high pressure (HP) motor-generators in response to various operational conditions promotes operational flexibility and power management optimization.

In implementing such LP motor-generators coupled with a fan shaft in a turbofan configuration, arrangement of the LP motor-generator between the fan and the combustor can be desirable. One suitable example of such a gas turbine engine having LP motor-generator may be found within U.S. Patent Application No. 2017/0335710, published on Nov. 23, 2017, the contents of which are incorporated by reference herein, in their entirety, including those aspects regarding gas turbine engine arrangements and/or operations.

Referring now to FIG. 1, an illustrative gas turbine engine 10 is shown having partial cutaway for descriptive purposes. The gas turbine engine 10 includes fan 12 arranged at a forward end 50, a compressor 14 for compressing air received from the fan 12, a combustor 16 for combusting a mixture of compressed air from the compressor 14 with fuel and producing hot exhaust flow, and a turbine 18 for expanding hot exhaust flow from the combustor 16 to provide engine thrust and mechanical force of rotation about an axis 15. Expanded exhaust flow is expelled from the turbine 18 at an aft end 55. The turbine 18 includes low pressure section 20 and high pressure section 22, each including a rotor 24 and blades 26 for transferring exhaust flow expansion into rotational force. The LP rotor 24 is coupled with an LP shaft 28 which is likewise coupled with a fan shaft 30 for transmitting rotational force to the fan 12.

The gas turbine engine 10 includes an LP motor-generator 32 for selective operation in drive and generate modes. The LP motor-generator 32 is arranged between the fan 12 and the compressor 14, coupled with the fan shaft 30 to exchange rotational force with the fan shaft 30 according to its mode.

Figure 2:
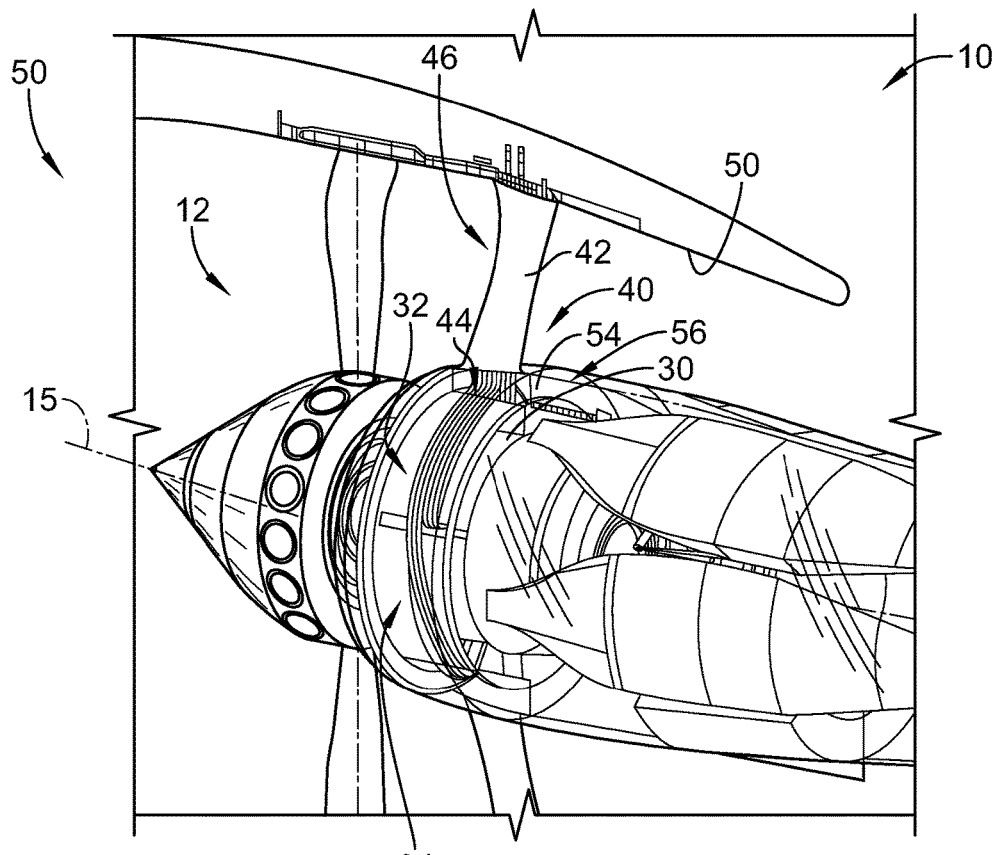
FIG. 2 is another perspective view of a portion of a similar gas turbine engine as in FIG. 1 near the aft end showing that the motor-generator is arranged aft of the fan and within an air inlet housing which defines a portion of the core flow path, and showing that a king strut or outlet guide vane extends from the air inlet housing between a divider that forms a radially inner boundary of a bypass section and a radially outer wall that forms the radially outer boundary of the bypass section.

Referring now to FIG. 2, the LP motor generator 32 is shown installed within an air inlet housing 34. The air inlet housing 34 provides structural support, and one suitable example of such an air inlet housing 34 is discloses as support frame 54 within U.S. Patent Application Publication No. 2017/0335710, published on Nov. 23, 2017, the contents of which are incorporated here by reference. As shown with certain portions of the gas turbine engine 10 rendered transparent for descriptive ease, an electrical power routing assembly 40 is shown for communicating electrical power with the LP motor-generator 32.

The electrical power routing assembly 40 illustratively includes a king guide vane 42 and a group of electrical cables 44 extending through the vane 42 to electrically connect with the LP motor-generator 32. The king guide vane 42 is arranged within a bypass section 46 of the gas turbine engine 10 and the electrical cables 44 extend through the king guide vane 42 to communicate electrical power with the LP motor-generator 32. The electrical cables 44 are configured to communicate the entire amount of electrical power required for communication with the LP motor-generator 32, for example, in all modes and/or electrical loadings of operation (0-100%) of the LP motor-generator 32. By routing all of the electrical cables 44 for the LP motor-generator 32 through a single guide vane, as a king vane, disturbances to the aerodynamic paths of the bypass section 46, for example, pressure, friction and/or other dissipative losses from physical intrusion into the bypass section 46, can be reduced while providing ease of access for electrical cabling. In some embodiments, other structural features for connection between the LP motor-generator 32 and outside the bypass section 46, such as other guide vanes, may be excluded altogether in this region of the bypass section 46.

Figure 3:
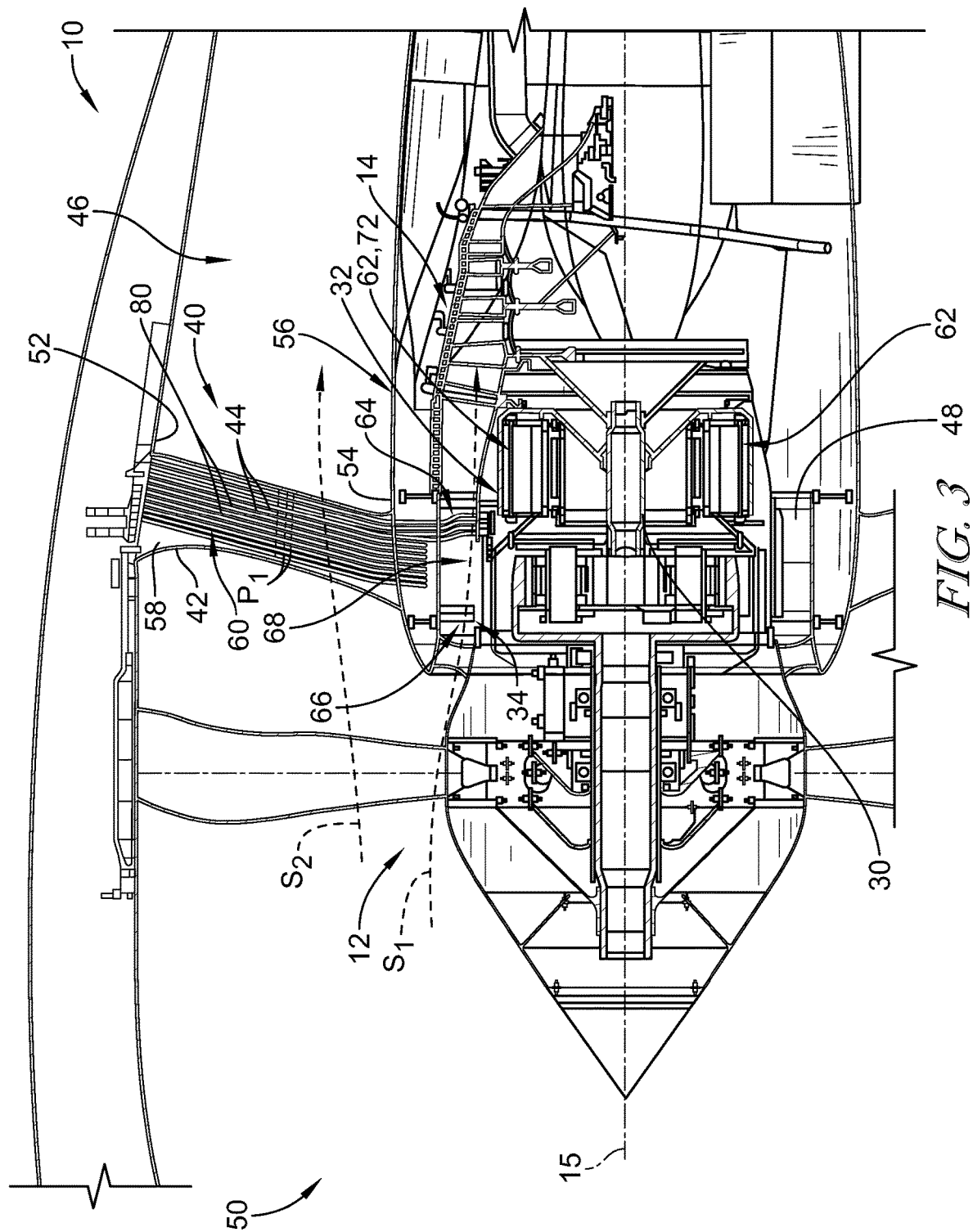
FIG. 3 is cross-sectional view of the gas turbine engine FIG. 2 showing that the engine includes an electrical power routing assembly for communication of electrical power with the motor-generator, including a network of electrical cables extending through the king strut.

Referring now to FIG. 3, a forward portion of the gas turbine engine 10 is shown in cross-section for descriptive purposes. The bypass section 46 is formed to carry bypass air $S_2$ illustrating a bypass flow path from the fan 12 across the king guide vane 42 through the bypass section 46 for downstream uses. A core flow stream $S_1$ illustrates a core flow path passing from the fan 12 through channels 66 of the air inlet housing 34, and onto the compressor 14 for compression, and subsequent use. The channels 66 of the air inlet housing 34 are circumferentially defined by radial struts 48 through which portions corresponding cables 44 extend for access to the LP motor-generator (as shown in FIG. 4).

Referring still to FIG. 3, the bypass section 46 is defined radially between outer boundary wall 52 and an inner boundary surface 54 formed by an annular divider 56. The king guide vane 42 includes a body 58 that extends radially between the divider 56 and the outer boundary wall 52. The body 58 of the king guide vane 42 illustratively includes an airfoil outer shape to guide bypass air through the bypass section 46. The body 58 defines a routing passageway 60 extending radially therethrough for receiving extension of the electrical cables 44 for connection with the LP motor-generator 32. At least one of the cables 44 connects with each of a number of electrical windings 62, 78 of the LP motor-generator 32 that are arrange circumferentially about the axis 15.

Figure 4:
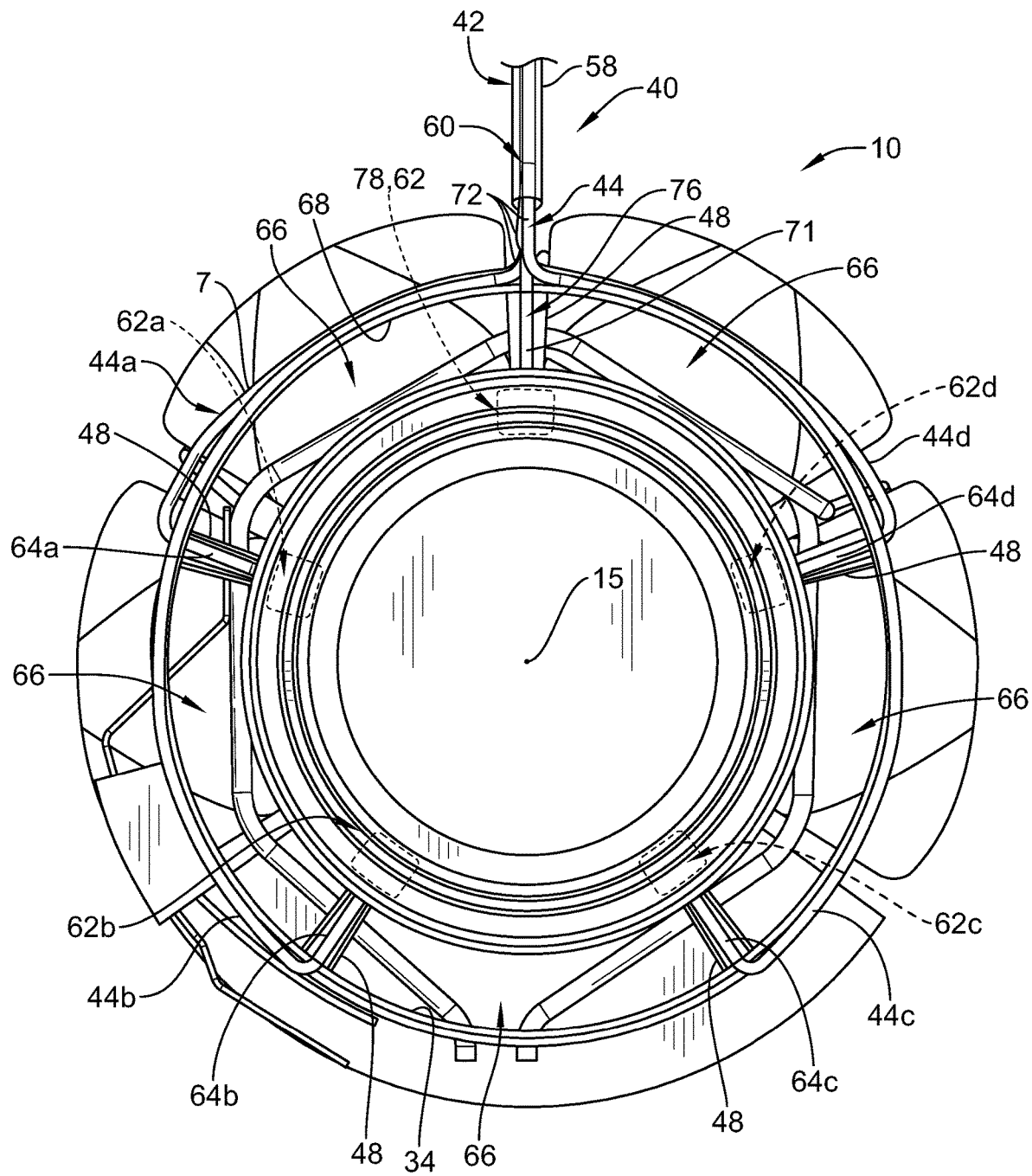
FIG. 4 is an axially aftward-looking view of a portion of the gas turbine engine of FIGS. 2 and 3 showing that the network of cables extends circumferentially about the air inlet housing to connect with circumferentially spaced windings of the motor-generator and include a radially extending portion penetrating through the air inlet housing for connection with the windings.

Referring to FIG. 4, some of the group of cables 44 can be seen to wrap circumferentially about the air inlet housing 34 within the divider 56 and between the inner boundary surface 54 of the bypass section 46 and an outer circumferential wall 68 of of the air inlet housing 34. In the illustrative embodiment, the LP motor-generator 32 includes five windings 62a, 62b, 62c, 62d, 78, and the cables 44 include cable sets 44a, 44b, 44c, 44d, 76 extending respectively to connect with the corresponding windings 62, 78. In the illustrative embodiment, the cable sets 44a, 44b extend circumferentially about one portion (counter-clockwise from the king guide vane 42 in the orientation of FIG. 4) of the air inlet housing 34 and the cable sets 44c, 44d extend circumferentially about another portion (clockwise from the king guide vane 42 in the orientation of FIG. 4). As mentioned below, winding 78 is illustratively circumferentially aligned with the king guide vane 42 and thus cable set 76 does not require circumferential extension. In the illustrative embodiment, the cable sets 44a-44d, 76 each include a set of three electrical cables, but in some embodiments, the cable sets 44, 76 may each include any suitable number of electrical cables, including one or more cables. In some embodiments, the LP motor-generator 32 may include any suitable number and/or arrangement of windings.

The cables 44 each include an inner extent 64,71 extending radially between connection with the corresponding winding 62, 78 and the outer circumferential wall 68 of the air inlet housing 34 which defines an inner portion of the divider 56. The cables 44 each include an outer extent 72 extending radially between the air inlet housing 34 and the outer boundary wall 52, through the king guide vane 42.

The cable sets 44a-44d each include a circumferential extent 74a, 74b, 74c, 74d extending circumferentially about the outer circumferential wall 68 between their respective inner and outer extents 64, 72. As previously mentioned, cable set 76 of which connects with winding 78 that is circumferentially aligned with the king guide vane 42 does not require circumferential extension to reach the king guide vane 42. Accordingly, the cables 44 form a network of cabling conforming to the circumferential shape of the air inlet housing 34.

Returning briefly to FIG. 3, the routing passageway 60 of the king guide vane 42 may be formed to include isolated passageways 80 each arranged to receive one of the cables 44 electrically isolated. Isolated passageways 80 can avoid the need for shielded cables, and can provide economy of assembly.

In illustrative embodiments, the LP motor-generator 32 is a dual-purpose motor-generator having drive and generate modes. However, in some embodiments, the electrical power routing assembly 40 may provide communication of electrical power with any suitable electrical machine, including but not limited to a dedicated motor or dedicated generator. Electrical cables 44 extend out through the guide vane 42 for connection with other power systems outside of the bypass section 46, for example, power storage and/or generation controllers.

The present disclosure includes high power electrification of traditional gas turbine engines (GTEs) introduces new problems with the logistics of routing associated power cables. Within the present disclosure, a 1.5 mega-watt (MW) motor/generator may be embedded into the core of a high bypass ratio turbo fan GTE. This motor/generator as an electric machine may be located within the air inlet housing, aft of the fan assembly, forward of the compressor. For context, the motor/generator may share shafting with the standard turbomachinery shafts to selectively provide a parallel power source, or to generate electrical power when there is excess available from the engine (e.g. cruise).

The present disclosure includes electric machines, such as the 1.5 MW motor/generator, operating in a larger class of service from conventional GTE electrical systems, which may include low voltage power, signal, and in some cases, electric starters and auxiliary generators in the sub-250 kW class. Depending on the configuration and power needs, electric machines within the present disclosure may operate in excess of 1000V DC or AC, and/or with a total current draw that may exceed 1000 Amps. The type of conductors for electric machines in this class, using/generating this amount of power and/or voltage is significantly larger than conventional GTE cables and electrical harnesses. Electric machines within the present disclosure may operate in tandem with power storage (e.g., battery) and/or electrical power generation system, for example, within the fuselage and/or wing of an aircraft. In order to electrically connect such high class electric machines with such other aircraft systems, power cables must egress from the location of the electric machine within the engine core, to the nacelle and beyond.

Arrangements to achieve such connection can include routing these cables out of the core casing, and up a single outlet guide vane (OGV), as a king outlet guide vane or strut. Such arrangements for cable egress may be configured to reduce and/or minimize intrusion into, and losses, in the fan bypass stream. As the large cable cross-sectional area may be a significant driver in the width of the OGV, a single "king" OGV could provide advantageous aerodynamic response, as opposed to utilizing multiple "wide" OGVs for this function. In some embodiments, common stranded wire bundled cables could be applied, although in some embodiments, custom designed solid conductor bus bars could be applied and may provide improvement for weight and/or space.

Conductors may be formed from any number of highly conductive materials, including copper, aluminum, silver, and/or gold. In illustrative arrangements, before the cables egress through the king vane, they must first pass from the engine core, through the casings. Depending on the location of the electric machine, the exact method of egress may vary. Within the present disclosure, the electric machine may be mounted within the air inlet housing (AIH). Since electric machines and AIH struts are both commonly axisymmetric about the engine centerline, the quantity and circumferential location of these struts and electric machine poles may be aligned to shorten paths for the cables radially outwards. Once in the divider space between the AIH and the inner bypass duct, the cables may be be routed to a common location where they egress through the "king" OGV into the nacelle.

As space within the engine core and OGV can be extremely limited, is may be advantageous to reduce the amount of conductor cross-section required to transmit this electrical power. Individually shielding each cable can reduce harmful EMI. However, eliminating this shielding in exchange for relying on the surrounding struts, AIH, and OGV as a faraday cage could greatly reduce the overall conductor size. Actively cooling cables, for example, by heat exchange with auxiliary air flow and/or cooling fluid may allow increase in the current through smaller conductors to reduce their resistive heat rise. Large amounts of power in the cables should simultaneously correspond to high mass flow of air through the engine and fan, some of which could be bled to cool these conductors, for example, by cooling air passages $p_1$ formed within the king outlet guide vane to receive bypass flow cooling air and/or core flow bleed therethrough and/or air inlet housing struts to receive core flow cooling air and/or bypass bleed therethrough. At points in the aircraft where space is less constrained, for example, outside of the core flow area, the conductor area could be increased to eliminate the need for active cooling in that area.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An electrical power routing assembly for providing electrical communication with an electrical machine of a gas turbine engine, the electrical power routing assembly comprising
a network of electrical cables for communicating electrical power, each of the electrical cables configured to connect with corresponding windings of the electrical machine that are arranged circumferentially about a rotational axis of the gas turbine engine, wherein each of the electrical cables includes an inner radial extent formed to extend radially between a connection with one of the corresponding windings and a divider defining a primary flow path of the gas turbine engine, and an outer radial extent formed to extend radially between the divider and an outer boundary wall defining a bypass flow path of the gas turbine engine; and
a king guide vane configured as a structural support within the bypass flow path of the gas turbine engine, the king guide vane including an airfoil body extending radially between the divider and the outer boundary wall, the airfoil body defining a routing passageway in the airfoil body, wherein the outer radial extent of each of the electrical cables extends through the routing passageway,
wherein at least some of the electrical cables include a circumferential extent arranged to extend circumferentially about the rotational axis of the gas turbine engine,
wherein the circumferential extent of the at least some of the electrical cables extends circumferentially between the inner and outer radial extents.

2. The electrical power routing assembly of claim 1, wherein the inner radial extent of each of the electrical cables is configured to extend radially through the primary flow path of the gas turbine engine.

3. The electrical power routing assembly of claim 1, wherein each of the electrical cables are configured to connect with the corresponding windings of the electrical machine that are arranged circumferentially spaced apart from each other about the rotational axis of the gas turbine engine.

4. The electrical power routing assembly of claim 1, wherein each of the electrical cables are configured to connect with the corresponding windings that are equally circumferentially spaced apart from each other.

5. The electrical power routing assembly of claim 1, wherein the network of electrical cables are configured to communicate an entire amount of electrical power communication with the electrical machine.

6. The electrical power routing assembly of claim 1, wherein the electrical machine is formed as electrical motor-generator configured for mechanical connection with a fan drive shaft of the gas turbine engine.

7. The electrical power routing assembly of claim 1, wherein the king guide vane is formed as an outlet guide vane for guiding bypass air received from a fan of the gas turbine engine.

8. The electrical power routing assembly of claim 1, wherein the routing passageway comprises a number of isolated paths extending through the airfoil body of the king guide vane, each of the isolated paths receiving one of the electrical cables of the network.

9. A gas turbine engine comprising
an turbine engine assembly including a fan for drawing air, a compressor for receiving the air from the fan for compression, a combustor for receiving compressed air from the fan for combustion with fuel to generate combustion gases, a turbine for receiving the combustion gases from the combustor for expansion to provide rotational drive to a fan shaft for transmission to the fan, and an electrical machine coupled with the fan shaft to communicate rotational force, wherein the turbine engine assembly includes a primary flow path for providing a first portion of the air from the fan to the compressor, and a bypass flow path for bypassing a second portion of the air from the fan around the compressor,
a network of electrical cables for communicating electrical power, each of the electrical cables configured to connect with corresponding windings of the electrical machine that are arranged circumferentially about a rotational axis of the gas turbine engine, wherein each of the electrical cables includes an inner radial extent formed to extend radially between a connection with one of the corresponding windings and a divider defining the primary flow path of the gas turbine engine, and an outer radial extent formed to extend radially between the divider and an outer boundary wall defining the bypass flow path of the gas turbine engine; and a king guide vane configured as a structural support within the bypass flow path of the gas turbine engine, the king guide vane including an airfoil body extending radially between the divider and the outer boundary wall, the airfoil body defining a routing passageway in the airfoil body, wherein the outer radial extent of each of the electrical cables extends through the routing passageway, wherein at least some of the electrical cables include a circumferential extent arranged to extend circumferentially about the rotational axis of the gas turbine engine to connect between the inner and outer radial extents.

10. The gas turbine engine of claim 9, wherein the inner radial extent of each of the electrical cables is configured to extend radially through the primary flow path of the gas turbine engine.

11. The gas turbine engine of claim 9, wherein the network of electrical cables are configured to provide an entire amount of electrical power communication with the electrical machine.

12. The gas turbine engine of claim 9, wherein the electrical machine is formed as electrical motor-generator coupled for rotation with the fan shaft to selectively provide and receive the rotational force.

13. The gas turbine engine of claim 9, wherein the king guide vane is formed as an outlet guide vane for guiding the second portion of the air received from the fan of the gas turbine engine.

14. The gas turbine engine of claim 9, wherein the king guide vane is circumferentially aligned with one of the corresponding windings of the electrical machine.

15. The gas turbine engine of claim 9, wherein the routing passageway comprises a number of isolated paths extending through the airfoil body of the king guide vane, each of the isolated paths receiving one of the electrical cables of the network.

16. The gas turbine engine of claim 9, wherein the inner radial extents of each of the electrical cables extend through a corresponding strut of an air inlet housing.

17. The gas turbine engine of claim 9, wherein at least one of the king guide vane and an air inlet housing include cooling air passages arranged in thermal communication with the electrical cables to receive the air through the cooling air passages to reduce cable temperature.

18. The gas turbine engine of claim 9, wherein the corresponding windings of the electrical machine are arranged equally circumferentially spaced apart from each other about the rotational axis of the gas turbine engine.

* * * * *